United States Patent [19]

Prochazka

[11] 4,266,978
[45] May 12, 1981

[54] SYNTHESIS OF MIXED OXIDE COMPOSITION

[75] Inventor: Svante Prochazka, Ballston Lake, N.Y.

[73] Assignee: General Electric Company, Schenectady, N.Y.

[21] Appl. No.: 51,695

[22] Filed: Jun. 25, 1979

[51] Int. Cl.³ .................. B01J 13/00; C03C 3/04; C03C 3/12; C03C 3/22; C04B 35/18; C04B 35/44; C04B 35/48

[52] U.S. Cl. ................ 106/39.5; 106/40 V; 106/40 R; 106/47 R; 106/52; 106/55; 106/56; 106/57; 106/58; 106/63; 106/65; 106/73.2; 106/73.4; 106/73.5; 106/62; 252/317; 264/1.1; 264/56; 264/65; 264/125; 423/326; 423/329; 423/593; 65/134

[58] Field of Search ............. 106/39.5, 73.4, 73.5, 106/52, 47, 48, 40 V, 40 R, 57, 65; 252/317; 423/326, 328, 329, 593; 264/1, 56

[56] References Cited

U.S. PATENT DOCUMENTS

| 2,809,124 | 10/1957 | Rick .................. 106/48 X |
| 3,180,741 | 4/1965 | Wainer ................ 106/73.2 X |
| 3,458,552 | 7/1969 | Hauck et al. .......... 106/39.5 X |
| 3,597,252 | 8/1971 | Schroeder et al. ........ 106/52 |
| 3,647,531 | 3/1972 | Matsushita et al. ...... 423/593 X |
| 3,654,161 | 4/1972 | Geus .................. 252/62.56 |
| 3,725,094 | 4/1973 | Levy et al. ............... 106/62 |
| 3,857,923 | 12/1974 | Gardner et al. ........... 423/593 |
| 3,966,482 | 6/1976 | Cassidy et al. .......... 106/65 X |
| 3,989,783 | 11/1976 | McGee ................ 106/73.4 X |
| 4,031,177 | 6/1977 | Auriol et al. .............. 264/65 |
| 4,181,532 | 1/1980 | Woodhead ............. 106/40 R |

FOREIGN PATENT DOCUMENTS 1282307 7/1972 United Kingdom .
1356248 6/1974 United Kingdom ........... 252/317

OTHER PUBLICATIONS

Mukherjee, S. P. et al. "A Comparative Study of Gels and Oxide Mixtures as Starting Materials for the Nucleation & Crystallization of Silicate Glasses" J. of Materials Sci. 11 (1976) pp. 341-355.

Primary Examiner—Helen M. McCarthy
Attorney, Agent, or Firm—Jane M. Binkowski; James C. Davis, Jr.; Leo I. MaLossi

[57] ABSTRACT

A non-aqueous gel of at least two metal oxides which is a precursor for glassy amorphous or crystalline mixed oxides is produced by reacting an alkoxide of one metal and a halide of another metal producing a low molecular weight polymeric reaction product, heating the reaction product to produce a polymeric product of substantially higher molecular weight, and heating the higher molecular weight polymeric product in air to remove its carbonaceous content.

21 Claims, 1 Drawing Figure

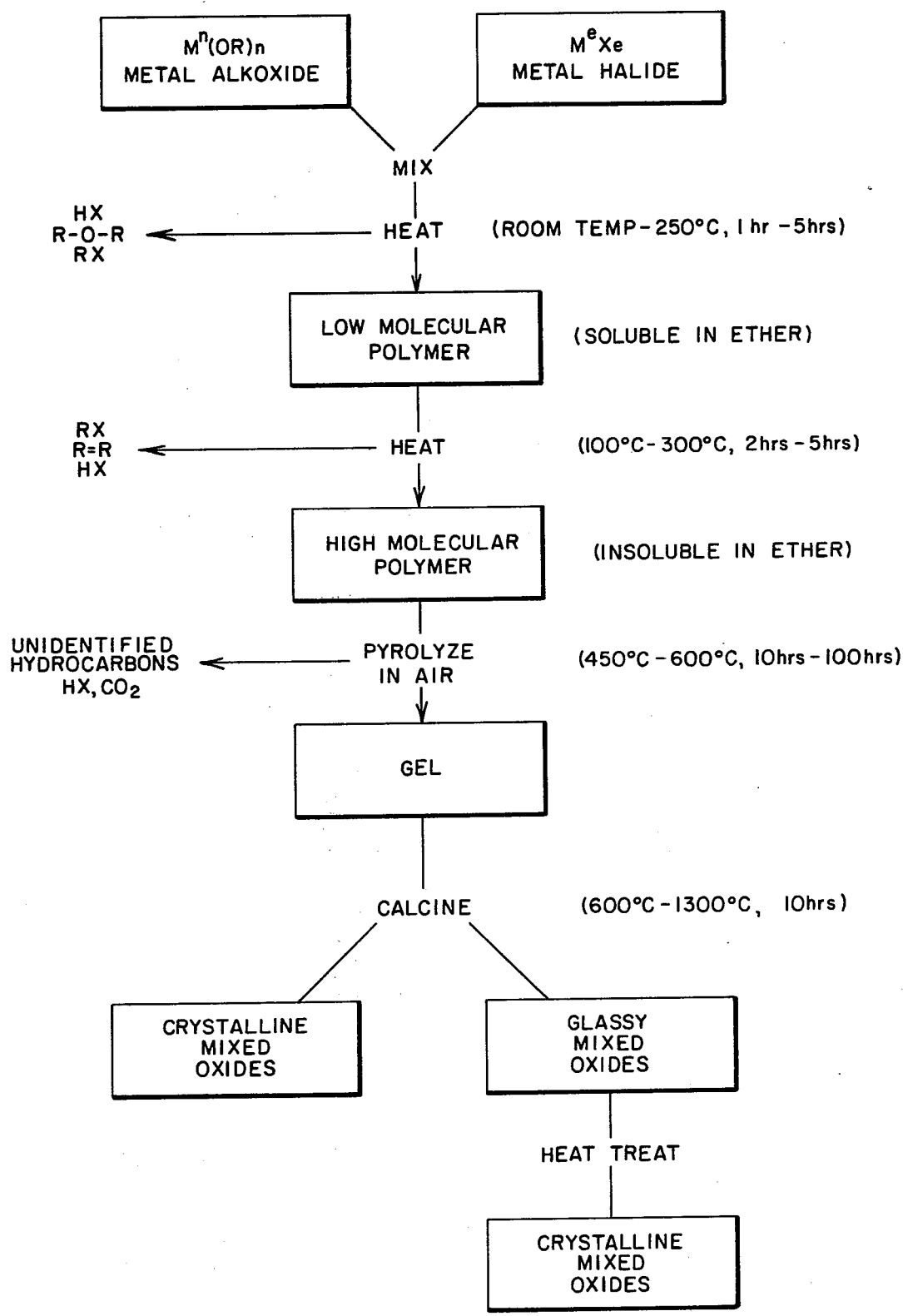

SYNTHESIS OF MIXED OXIDE COMPOSITION

The present invention relates to the synthesis of a novel non-aqueous gel of at least two metal oxides. The gel is a precursor for non-aqueous amorphous glassy or crystalline mixed metal oxides homogeneous on a submicroscopic level.

For the preparation of multicomponent oxide ceramics extremely fine and homogeneous starting compositions are essential. For this purpose a number of processes have been developed of which the most popular are: (1) Freeze drying and decomposition of salt solutions and; (2) Coprecipitation of suitable compounds from solutions such as hydroxides, oxalates, citrates, etc. The degree of homogeneity achieved by these processes is limited by the nature of these processes and is insufficient in some demanding application such as, for example, optical ceramics. It is, for instance, difficult to imagine that conditions could be established that would assure precipitation of two chemical species from a solution exactly at such rates that will keep the composition of the final product constant at every stage. As a result, none of the prior art processes have produced products which are homogeneous on a submicroscopic level. Also, all of the prior art processes have produced mixed oxides which contain water, hydroxyl groups, or both, which may be eliminated by heating the mixed oxide product at relatively high temperatures, such as about 600° C. for prolonged periods of time, or which may not be removable, depending upon the particular mixed oxide product produced. The presence of water or hydroxyl groups in the mixed oxides has a significantly deleterious effect on optical properties of ceramics produced therefrom.

In the present invention, a non-aqueous mixture of at least two metal oxides is synthesized which is homogeneous on a submicroscopic level making it more reactive on hot-pressing or sintering. Also, the present process allows the production of mixed metal oxides of selected stoichiometry.

Briefly stated, the present process comprises reacting a mixture of a metal alkoxide and a metal halide at a temperature ranging from about room temperature up to about 250° C. and at a pressure ranging from atmospheric pressure up to about 10 atmospheres forming a polymeric reaction product, said metal alkoxide being $M^n(OR)_n$ where $M^n$ is a metal ion, R is an alkyl radical, and n is the valence of $M^n$, said metal halide being $M^eX_e$ where $M^e$ is a metal ion different from $M^n$, X is a halide selected from the group consisting of chloride, bromide, iodide and fluoride, and e is the valence of $M^e$, both said $M^n$ and $M^e$ being contained in said reaction product, heating said polymeric reaction product at a temperature ranging from about 100° C. up to about 300° C. producing a brown ether-insoluble polymeric product, calcining said brown polymeric product in air or oxygen at a temperature ranging from about 450° C. to about 600° C. producing a solid amorphous gel comprised of a submicroscopically homogeneous mixture of the oxides of $M^n$ and $M^e$ and up to about 0.02% by weight of elemental carbon, and being free of water and hydroxyl groups. The gel is then calcined at a temperature ranging from about 600° C. up to about 1300° C. producing a glassy or crystalline submicroscopically homogeneous mixture of the oxides of $M^n$ and $M^e$ and up to about 0.02% by weight of elemental carbon, which is free of water and hydroxyl groups.

In the present invention, the absence of water and hydroxyl groups is determined by infrared spectroscopy, and specifically, by the lack of an absorption signal in the infrared spectrum at 3 microns, since the hydroxyl group gives a strong signal in the infrared spectrum at 3 microns.

Also, that the present mixtures are homogeneous on a submicroscopic level is established by transmission electron microscopy at high resolution, i.e. a magnification of at least about 100,000.

BRIEF DESCRIPTION OF THE DRAWING

The present invention will be better understood from the following description taken in connection with the accompanying drawing which shows a flow diagram of the general conditions of the present process.

The metal alkoxide of the present process is $M^n(OR)_n$ where $M^n$ is metal ion, R is an alkyl radical and n is the valence of $M^n$. The metal halide of the present process is $M^eX_e$ where $M^e$ is metal ion, X is halide and e is the valence of $M^e$. In carrying out the condensation reaction of $M^n(OR)_n$ with $M^eX_e$, $M^n$ and $M^e$, although interchangable, are not the same in a single reaction in order that a mixture of at least two metal oxides be produced. There is no limitation of $M^n$ or $M^e$ metal ions and representative of such metal ions is aluminum, zirconium, magnesium, titanium, hafnium, iron, chromium, zinc, barium, strontium, silicon and calcium.

R is an alkyl radical and there is no limitation on the number of carbon atoms which it can obtain. Generally, however, the alkyl radical has 1 to 5 carbon atoms since an alkyl radical containing more than 5 carbon atoms provides no significant advantage in the present invention. The present alkyl radical can be in a straight chain, in a branched chain or in the form of a carbon ring.

The halide of the present invention can be chloride, bromide, iodide or fluoride. For most applications, and preferably, it is chloride.

The particular ratio of metal alkoxide and metal halide used in carrying out the reaction can vary and depends on the desired composition of mixed metal oxides or the stoichiometry of the specific compound or mineral desired as the product. All of the metal ions of the reacted metal alkoxide and metal halide, i.e. the polymeric condensation reaction product, are contained in the resulting gel and glassy or crystalline mixed oxides. For example, the mineral, mullite, has a certain ratio of aluminum and silicon ions since it is aluminum silicate ($3Al_2O_3 \cdot 2SiO_2$). If the aluminum or silicon ions are in excess in the resulting present oxide mixture, and such mixture is hot-pressed or sintered into a ceramic, the excess metal ions will form a separate mineral phase and such phase separation will render the ceramic opaque. A certain variation from the stoichiometric composition that may be very small is possible, and may still be accomplished and produce a single phase optically translucent or transparent ceramic. The extent of possible variation from stoichiometric composition depends on the solubility of the metal oxide being in excess in the binary compound. But if the solubility of that ceramic structure is exceeded, a second phase is always obtained. For that reason, for the production of a single phase ceramic, the stoichiometric ratio of the mixed oxides is critical.

In carrying out the present process, the metal alkoxide is admixed with the metal halide and the condensation reaction is carried out from room temperature, i.e. usually about 25° C., up to about 250° C. at a pressure ranging from atmospheric up to about 10 atmospheres with the particular temperature and pressure conditions depending largely on the particular metal alkoxide and halide used. The present reaction normally would be carried out under reflux conditions. Temperatures higher than 250° C. provide no significant advantage since they tend to decompose the reactants. Temperatures lower than room temperature do not bring about reaction and pressures lower than atmospheric are not useful since they tend to foam the reactants during the reaction. The reaction period depends largely on the particular reactants and reaction conditions, but generally, it ranges from about one hour to about five hours.

The present reaction of metal alkoxide with metal halide usually goes to completion forming a low molecular polymeric product which can be a viscous liquid but usually is a solid, and usually ranges in molecular weight from about 2,000 up to about 20,000. It is soluble in ethyl ether at room temperature. The by-products of this reaction are gaseous components which evaporate away such as alkyl or hydrogen halide and alkyl ether.

The ether-soluble low molecular weight polymeric reaction product is heated at a temperature ranging from about 100° C. up to about 300° C. to produce a brown polymeric product insoluble in ethyl ether at room temperature. This heating is carried out in a substantially moisture-free atmosphere, i.e. an atmosphere which produces a brown ether-insoluble polymeric product free of water and hydrogen groups, such as, for example, a vacuum or substantially dry oxygen, air or argon, for example having a dewpoint less than 0° C. The particular period of time for carrying out heating of the polymeric reaction product depends largely on temperature and the product itself, but generally, it ranges from two to about five hours. The brown ether-insoluble polymeric product is more highly polymerized than the polymeric reaction product, and usually it has a molecular weight ranging up from about 50,000.

The brown ether-insoluble polymeric product is pyrolyzed in air or oxygen at a temperature ranging from about 450° C. to about 600° C. to remove its carbonaceous content and produce the present precursor gel which may contain up to about 0.02% by weight of elemental carbon based on the total weight of said gel.

The gel produced by the present process is a non-aqueous amorphous solid with a large internal surface area due to interconnecting pores open to the surface. The gel has a specific surface area as determined by low temperature nitrogen absorption higher than 10 square meters per gram and such high surface area makes possible the removal of carbonaceous matter and elemental carbon. The gel is comprised of a submicroscopically homogeneous mixture of two or more metal oxides and up to about 0.02% by weight of elemental carbon.

The gel is calcined at a temperature ranging from about 600° C. to about 1300° C., preferably in air or oxygen, to produce the present glassy or crystalline submicroscopically homogeneous mixture of two or more metal oxides and up to about 0.02% by weight of elemental carbon based on the total amount of said glassy or crystalline mixture. The particular calcining temperature used depends largely on the particular system. For example, when the gel is a mixture of oxides for producing glassy material and a glassy product is desired, the temperature used is one which will not crystallize such material. Temperatures higher than 1300° C. provide no significant advantage. On the other hand, if desired, the glassy mixture of oxides may be further heated at temperatures which will crystallize such system.

The transition of the gel to crystallize mixed oxides can be determined by X-ray diffraction analysis. The transition of the gel to glassy mixed oxides is determinable by the specific surface area. Specifically, the present glassy or crystalline mixture produced from the gel is impermeable and has a specific surface area as determinable by low temperature nitrogen absorption of lower than 5 square meters per gram.

Residual elemental carbon in the gel when, during calcination, the gel transforms into glassy or crystalline mixture of oxides locking such residue elemental carbon therein, can vary up to about 0.02% by weight of the total weight of gel or total weight of glassy or crystalline mixture. Specifically, for production of the present optically translucent or transparent ceramic, residual elemental carbon should be insufficient to have a significantly deleterious effect on such optical properties, i.e. it should not render the ceramic opaque. In such instance the residual elemental carbon should be less than about 0.01% by weight, with the particular amount depending largely on the particular system.

Preferably, to insure good optical properties, the residual elemental carbon should not be detectable by fusion and volumetric determinations, i.e. an amount less than about 0.002% by weight of the total weight of the gel or glassy or crystalline product. Generally, residual elemental carbon ranging from about 0.01% by weight up to about 0.02% by weight will render the ceramic formed therefrom opaque but such ceramic is still useful for a wide range of applications such as, for example, crucibles, furnace ware and electrical insulators.

The present gel, glassy or crystalline mixture of metal oxides can be comminuted, for example ground or milled, to produce a powder of desired size, generally having an average particle size ranging from submicron up to about 10 microns. The resulting powder can be hot-pressed or sintered to produce a glassy or polycrystalline ceramic, depending upon the particular oxide composition and the particular hot-pressing or sintering conditions.

Specifically, hot-pressing conditions for the present gel, glassy or crystalline oxide powder can vary widely depending largely on the particular oxides being hot-pressed and the particular requirements of the ceramic to be produced. For most applications, the glassy or polycrystalline ceramic requires a density ranging from about 70% to about 100%. To produce ceramics of such density, hot-pressing temperatures can range from about 500° C. to about 1600° C. and applied pressures from about 1,000 psi to about 10,000 psi. Hot-pressing can be carried out at atmospheric pressure in an atmosphere such as helium or argon or in a vacuum as low as about 10 microns.

Likewise, sintering conditions can vary widely depending upon the particular composition of the present oxide mixture and the particular requirements of the ceramic product. For most applications, the glassy or polycrystalline ceramic requires a density ranging from about 70% to about 100% and thus requires temperatures ranging from about 500° C. up to about 2000° C. The sintering atmosphere is one which has no significant deleterious effect on the sintering process and the ceramic product, and preferably it is at atmospheric pressure in an atmosphere of oxygen, hydrogen, argon or helium, or a vacuum.

Where the proper stoichiometric ratio of metal alkoxide and metal halide has been used in carrying out the condensation reaction corresponding to a compound in the two or more oxide system, the resulting mixed oxides are in stoichiometric ratio and on consolidation produce the desired compound. Such mixed metal oxides of desired stoichiometric composition can be hot-pressed or sintered to produce a glassy or polycrystalline ceramic of single phase of theoretical density translucent or transparent to light rays of particular wavelength. Such light rays can be ultraviolet or infrared, or can fall in the visible spectrum. The present optically transparent or translucent ceramics are useful for a variety of applications such as radomes and windows for the protection of electromagnetic sensor devices, as hermetically sealed enclosures for gas discharge arcs and as furnace windows.

The invention is further illustrated by the following examples where, unless otherwise indicated, the following procedures were used:

Density of powders was determined by means of helium displacement.

Density of sintered or hot-pressed specimens was determined by liquid displacement.

Where a specific value is given for specific surface area, it was determined by low temperature nitrogen absorption.

Content of elemental carbon was measured by fusion and volumetric determinations, and if elemental carbon could not be detected, the material was considered free of elemental carbon, i.e. it contained less than the detectable amount of 0.002% by weight.

The lack of water or hydroxyl groups was determined by infrared spectroscopy by the lack of an absorption signal in the infrared spectrum at 3 microns which gives a strong absorption signal for the hydroxyl group.

The homogeneity of the gel was established by transmission electron microscopy at a resolution of about 100,000.

EXAMPLE 1

54.3 grams of redistilled aluminum isopropoxide was mixed in a flask with 15.06 grams of silicon chloride and heated under reflux conditions at 180° C. The reactants released volatile by-products and gradually, within about 30 minutes, turned into a colorless viscous liquid which on cooling solidified into a white solid. A portion of this white solid was dissolved in ethyl ether at room temperature.

The white solid was determined to be a low molecular weight polymer by cryoscopic determination in CCl$_4$. The white solid was heated at a temperature of about 200° C. under reduced pressure of about 500 torr, and yielded a brown, solid polymeric product. The brown product was removed from the flask and a portion of it was placed in ethyl ether at room temperature and found to be ether-insoluble. The brown product was heated at 600° C. in a crucible in air for 24 hours. The yield was 18.8 grams of a white substance, i.e. gel, which was amorphous to X-ray, transparent under the microscope and contained 27.3% by weight of SiO$_2$ by wet analysis. Both the yield and the SiO$_2$ content, and identification of the volatile by-products by boiling point measurement, indicate that the overall stoichiometry of the reaction was:

$$6Al(OCH(CH_3)_2)_3 + 2SiCl_4 = 8C_3H_7Cl + 5(C_3H_7)_2O + 3Al_2O_3 \cdot 2SiO_2$$

and resulted in an oxide composition corresponding to a novel mullite in glassy form.

After heating of the gel to 1250° C., in air for one hour, it showed diffuse X-ray diffraction lines of mullite (3Al$_2$O$_3$.2SiO$_2$), which after heat treatment at 1500° C. for one hour in air, became very strong and distinct.

The gel was free of elemental carbon, and was comprised of a submicroscopically homogeneous mixture of the oxides of aluminum and silicon. The gel, as well as the glassy and crystalline forms of mullite, were free of water and hydroxyl groups.

The gel had a specific surface area of 80 square meters per gram. On the other hand, the glassy and crystalline forms of mullite had a specific surface area of less than about 0.1 square meters per gram.

EXAMPLE 2

23.3 grams of reagent grade anhydrous zirconium tetrachloride was dissolved in 20.8 grams of redistilled ethylsilicate at about 40° C. The reactants were heated in a flask under reflux conditions at 70° C. The viscosity was increased and hydrogen chloride along with other gaseous reaction products was given off. After 40 minutes the reaction was stopped and the product solidified on cooling into a white solid mass soluble in ethyl ether and acetone at room temperature.

The reaction product from the condensation was transferred into another flask and gradually heated under reduced pressure of about 100 torr. The solid remelted at about 60° C. and rapidly solidified at 120° C. into a brown polymeric solid foam insoluble in ethyl ether and acetone at room temperature. The yield of the brown polymeric solid was 31 grams.

This brown solid was pyrolyzed at 500° C. for 50 hours in air and resulted into a light tan gel foam of glassy appearance, transparent in thin layers. X-ray analysis gave no diffractions confirming the amorphous nature of this tan gel foam which had a specific surface area higher than 10 square meters per gram.

The tan gel was heated at 650° C. in air for about one hour but the product was still amorphous. A portion of the product was then heated for one hour at 1500° C. in air and a sample of the resulting product gave an X-ray diffraction pattern of zirconium silicate, ZrSiO$_4$. This crystalline zirconium silicate had a specific surface area of less than about 0.1

The yield was 18.8 grams. The overall reaction may be schematically summarized as follows:

$$Si(OC_2H_5)_4 + ZrCl_4 = ZrSiO_4 + 4HCl + 4C_2H_4$$

The gel was free of elemental carbon. The gel as well as the crystalline zirconium silicate were also free of water and hydroxyl groups.

EXAMPLE 3

8 grams of anhydrous aluminum chloride, 12.2 grams of distilled aluminum isopropoxide and 8.5 grams of ethylsilicate were dissolved in a flask in 200 cc xylene and the solution heated for 1 hour at 120° C. After that, the xylene was removed by distillation under reduced pressure of 20 mm Hg at 40° C. The residue was 24 grams of a yellow solid which turned rapidly brown when the solvent was completely removed on further heating under the reduced pressure of 20 mm Hg at 40°

C. The brown substance, which was insoluble in ethyl ether at room temperature, was removed from the flask and heated on a tray in a furnace in air at 600° C. for 16 hours. The resulting white friable product, i.e. gel, was homogenized by grinding in mortar. It had a specific surface area of 117 m$^2$/g and a density of 2.32 g/cc. It was subjected to X-ray diffraction analysis but no diffractions were observed on X-ray pattern confirming its amorphous nature.

It was then heated in air at 1200° C. for 1 hour. The resulting powder was white and broad diffractions by X-ray diffraction analysis corresponding to mullite could be identified.

EXAMPLE 4

A gel, prepared in the same manner as disclosed in Example 1, was calcined at 1150° C. for one hour in air. It was vibratory milled for 6 hours in an aqueous dispersion with aluminum grinding media. The resulting powder was dried in a vacuum oven at 150° C. overnight and loaded into a 2 inch diameter carbon hot-pressing die. Hot-pressing was done under vacuum of 200 microns at 1550° C. for 40 minutes. The recovered billet was gray and had a density of 3.17 g/cc, corresponding to theoretical density of mullite. X-ray diffraction of high resolution did not show any other diffraction except those corresponding to mullite. A slab, 27 mils thick, was machined from the specimen, annealed in air at 1350° C. for 20 hours and optically polished. Spectrophotometric determination of in-line transmittance at a wave length of 4μ gave 77% corresponding to a value of an absorption coefficient of 5 cm$^{-1}$, a value sufficiently low for an optical ceramic useful in the infrared for application as an infrared transmitting window.

EXAMPLE 5

An amorphous tan gel foam of zirconium silicate composition prepared as disclosed in Example 2 was broken up in a mortar into a powder and screened through a 200 Tyler mesh sieve. The powder was loaded into a one inch diameter carbon die and hot-pressed at 1500° C. for 30 minutes in argon applying a load corresponding to 8000 psi throughout the whole pressing cycle.

The faces of the resulting pressing were ground and polished. The polished specimen was light grey, had a density of 4.60 grams/cc, i.e. it was theoretically dense, and gave an X-ray diffraction pattern of zirconium silicate. The glassy zirconium silicate had become crystalline during hot-pressing. A section 40 mils thick prepared from the polished specimen was sufficiently translucent for white light to show print on contact making it particularly useful as a lamp envelope.

EXAMPLE 6

A gel prepared as disclosed in Example 1 was calcined at 1150° C. in air for 3 hours, ball milled dry for 3 hours and screened through 325 mesh Tyler screen. $\frac{5}{8}$ inch discs were compacted from this powder and had a green density of 1.73 g/cc. The specimens were sintered in flowing oxygen at 1750° C. for 3 hours. The sintered specimens showed 17.5% shrinkage, a density of 3.11 g/cc (about 98.2% density) and were pore free by metallographic examination.

What is claimed is:

1. A process for producing a solid amorphous precursor gel composed of at least two metal oxides, said solid gel being free of water and hydroxyl groups and having a specific surface area higher than 10 square meters per gram, consisting essentially of reacting under reflux conditions in a substantially moisture-free atmosphere a mixture of metal alkoxide and metal halide at a temperature ranging from about room temperature up to about 250° C. at a pressure ranging from atmospheric pressure to superatmospheric pressure ranging up to about 10 atmospheres forming a polymeric reaction product, said metal alkoxide being $M^n(OR)_n$ where $M^n$ is metal ion, R is an alkyl radical, and n is the valence of $M^n$, said metal halide being $M^eX_e$ where $M^e$ is metal ion different from $M^n$, X is a halide selected from the group consisting of chloride, bromide, iodide and fluoride, and e is the valence of $M^e$, heating said polymeric reaction product in a substantially moisture-free atmosphere at a temperature ranging from about 100° C. up to about 300° C. producing a polymeric product insoluble in ethyl ether at room temperature, pyrolyzing said ether-insoluble polymeric product in air or oxygen at a temperature ranging from about 450° C. to about 600° C. producing said gel comprised of a submicroscopically homogeneous mixture of the oxides of $M^n$ and $M^e$ and up to about 0.02% by weight of elemental carbon based on the total weight of said gel.

2. The process according to claim 1 wherein said gel is calcined at a temperature ranging from about 600° C. to about 1300° C. producing an impermeable, glassy submicroscopically homogeneous mixture of the oxides of $M^n$ and $M^e$ and up to about 0.02% by weight of elemental carbon based on the total weight of said glassy mixture having a specific surface area less than 5 square meters per gram and being free of water and hydroxyl groups.

3. The process according to claim 1 wherein said gel is calcined at a temperature ranging from about 600° C. to about 1300° C. producing an impermeable, crystalline submicroscopically homogeneous mixture of the oxides of $M^n$ and $M^e$ and up to about 0.02% by weight of elemental carbon based on the total weight of said crystalline mixture having a specific surface area less than 5 square meter per gram and being free of water and hydroxyl groups.

4. A process according to claim 1 wherein one of said metal ions is aluminum and another of said metal ions is silicon.

5. A process according to claim 1 wherein one of said metal ions is zirconium and another of said metal ions is silicon.

6. A solid amorphous precursor gel free of water and hydroxyl groups and having a specific surface area higher than 10 square meters per gram, said gel consisting essentially of a submicroscopically homogeneous mixture of at least two metal oxides and up to about 0.02% by weight of elemental carbon based on the total weight of said gel, said gel having interconnecting pores open to the surface.

7. A solid amorphous gel according to claim 6 wherein said metal oxides are of aluminum silicate composition.

8. A solid amorphous gel according to claim 6 wherein said metal oxides are of zirconium silicate composition.

9. An impermeable, glass submicroscopically homogeneous mixture of at least two metal oxides and up to about 0.02% by weight of elemental carbon based on the total weight of said glassy mixture, said glassy mixture being free of water and hydroxyl groups, said glassy mixture being prepared by the process of claim 2.

10. An impermeable crystalline submicroscopically homogeneous mixture of at least two metal oxides and up to about 0.02% by weight of elemental carbon based on the total weight of said crystalline mixture, said crystalline mixture being free of water and hydroxyl groups, said crystalline mixture being prepared by the process of claim 3.

11. A polycrystalline ceramic body produced by hot-pressing the gel of claim 6 and having a density ranging from about 70% to about 100%.

12. A polycrystalline ceramic body produced by sintering the gel of claim 6 and having a density ranging from about 70% to about 100%.

13. A polycrystalline ceramic body produced by hot-pressing the glassy mixture of claim 9 and having a density ranging from about 70% to about 100%.

14. A polycrystalline ceramic body produced by sintering the glassy mixture of claim 9 and having a density ranging from about 70% to about 100%.

15. A substantially single phase, optically translucent or transparent ceramic produced by hot-pressing the glassy mixture of claim 9 at a pressure and temperature sufficient to produce a ceramic of theoretical density.

16. A substantially single phase, optically translucent or transparent ceramic produced by sintering the glassy mixture of claim 9 in an atmosphere which has no significant deleterious effect on said ceramic and at a temperature sufficient to produce a ceramic of theoretical density.

17. A polycrystalline ceramic body produced by hot-pressing the crystalline mixture of claim 10 and having a density ranging from about 70% to about 100%.

18. A polycrystalline ceramic body produced by sintering the crystalline mixture of claim 10 and having a density ranging from about 70% to about 100%.

19. A substantially single phase, optically transparent or translucent polycrystalline ceramic produced by hot-pressing the crystalline mixture of claim 10 at a pressure and temperature sufficient to produce a ceramic of theoretical density.

20. A substantially single phase, optically transparent or translucent polycrystalline ceramic produced by sintering the crystalline mixture of claim 10 in an atmosphere which has no significant deleterious effect on said ceramic and at a temperature sufficient to produce a ceramic of theoretical density.

21. An impermeable glassy submicroscopically homogeneous mixture of oxides of aluminum and silicon corresponding to about $3Al_2O_3 \cdot 2SiO_2$ and up to about 0.02% by weight of elemental carbon based on the total weight of said glassy mixture, said glassy mixture being free of water and hydroxyl groups.

* * * * *